(12) United States Patent
Hammond et al.

(10) Patent No.: US 7,338,374 B2
(45) Date of Patent: Mar. 4, 2008

(54) ADJUSTABLE TENSION ANALOG STICK FOR A VIDEO GAME PAD

(75) Inventors: Michael Hammond, Madison, WI (US); Lee Wing Hang, Shatin (HK)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 10/987,334

(22) Filed: Nov. 12, 2004

(65) Prior Publication Data

US 2005/0124416 A1 Jun. 9, 2005

Related U.S. Application Data

(60) Provisional application No. 60/520,119, filed on Nov. 14, 2003.

(51) Int. Cl.
*A63F 11/00* (2006.01)
(52) U.S. Cl. ............................. 463/38; 463/36; 463/37
(58) Field of Classification Search ............. 463/36–38
See application file for complete search history.

(56) References Cited

U.S. PATENT DOCUMENTS

| 5,113,179 A | * | 5/1992 | Scott-Jackson et al. ...... 345/161 |
| 5,591,082 A | * | 1/1997 | Jensen et al. ................. 463/38 |

* cited by examiner

*Primary Examiner*—Robert E. Pezzuto
*Assistant Examiner*—Robert E. Mosser
(74) *Attorney, Agent, or Firm*—Bell, Boyd & Lloyd LLP

(57) ABSTRACT

An adjustable control apparatus for a video game pad that enables a user to adjust the tension of the apparatus to enhance the comfort and control of the apparatus and the video game pad. The assembly of the control apparatus includes a positioning member or stick which is nested inside a housing. The assembly also includes a clutch member and a tension member assembled between the stick and housing. The positioning member and housing are connected or otherwise held together using a support member such as a C-ring. The C-ring fits into a groove on the shaft of the stick. A flexible member is positioned between the stick and the housing. Additionally, a signal transfer member is connected to or assembled to a circuit board such as a PC board to transfer electrical signals or the like from the control apparatus to the circuit board.

20 Claims, 8 Drawing Sheets

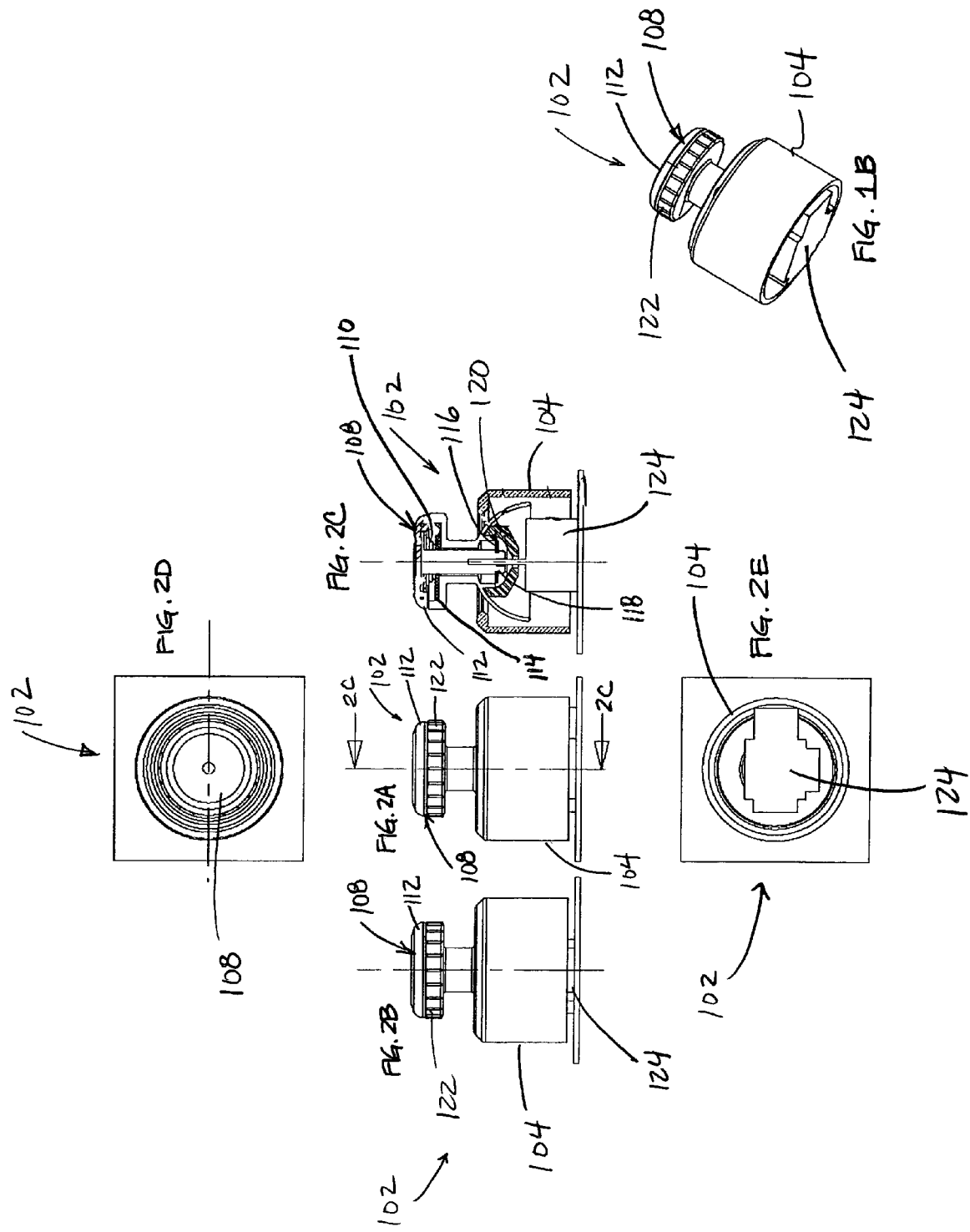

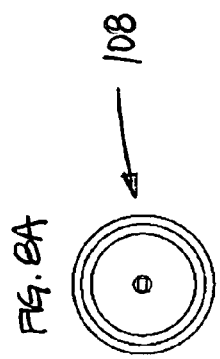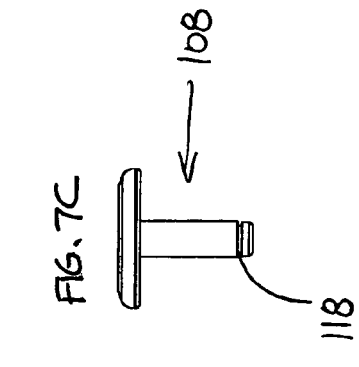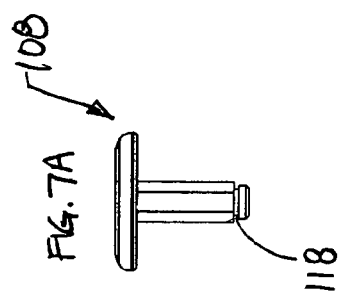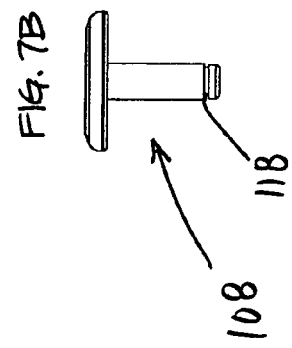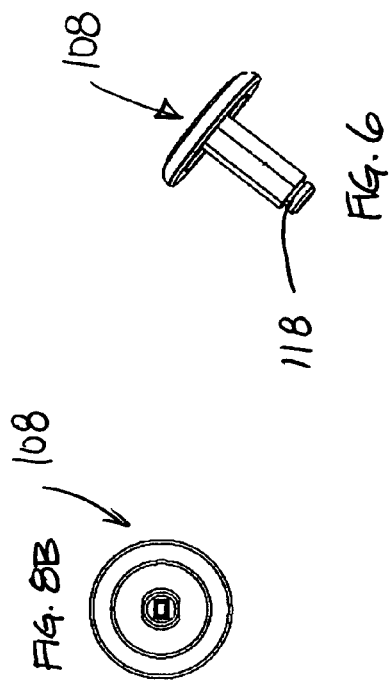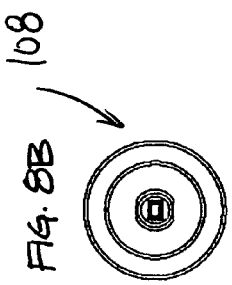

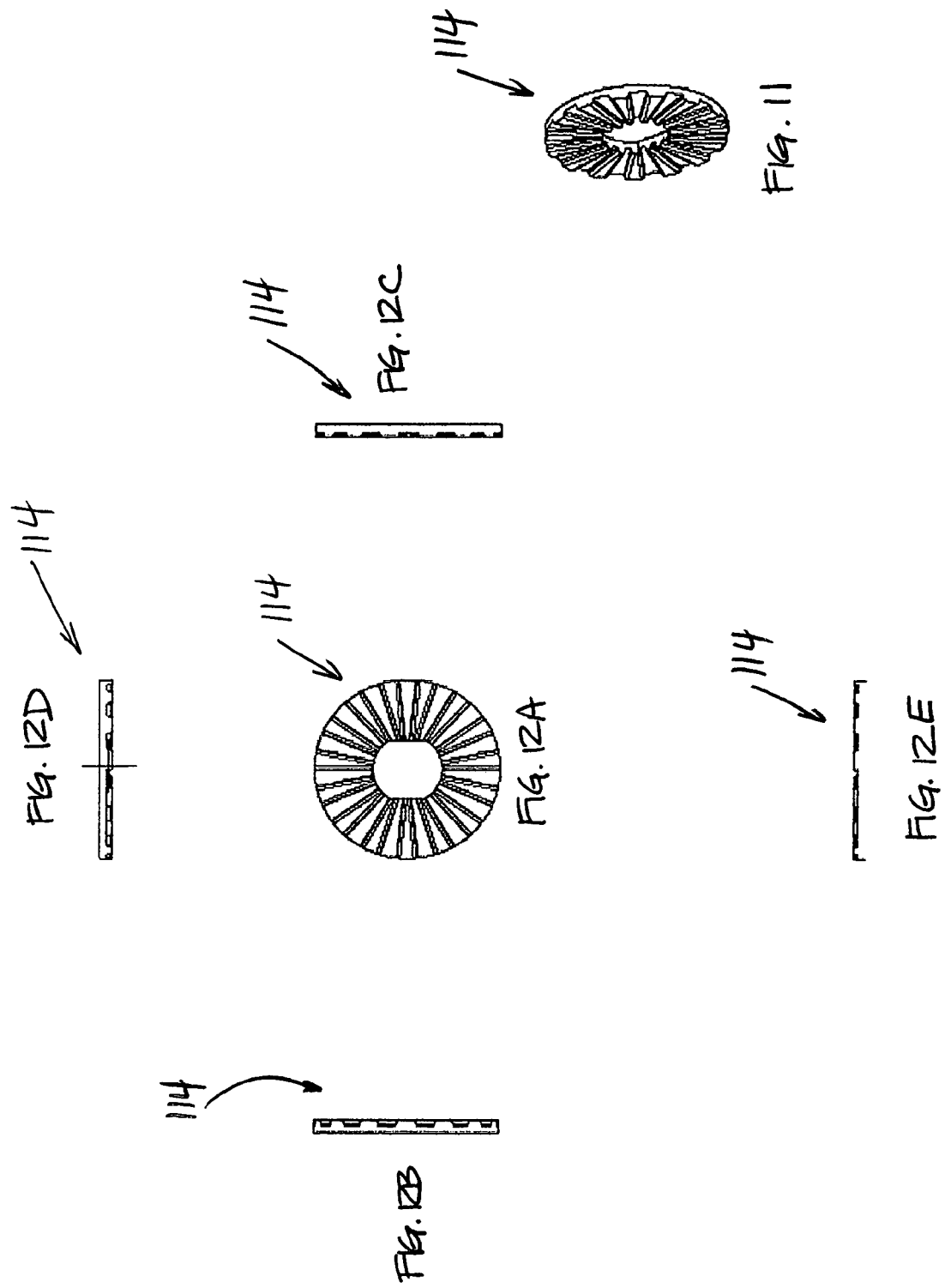

ADJUSTABLE TENSION ANALOG STICK FOR A VIDEO GAME PAD

PRIORITY CLAIM

This application is a non-provisional patent application and claims priority to and the benefit of U.S. Provisional Patent Application Ser. No. 60/520,119, filed Nov. 14, 2003, the entire contents of which are incorporated herein.

BACKGROUND OF THE INVENTION

In the video game industry, there are several different types of game controllers or video game pads for video games. Video game players use the video game pads to control and manipulate different functions or operations in the video games. The video game pads typically include different controls or input devices such as buttons, triggers or tension analog sticks to control these operations.

The 'feel' of existing analog sticks for video game pads is set by the design of the stick and the pad assembly. In particular, the resistance of the stick determines how easy or difficult the stick is to manipulate and control. The level of resistance also affects a player's comfort level using the stick while playing a video game.

Known analog sticks do not allow players to control the level of lateral resistance of the sticks. Therefore, a player's level of comfort and control using a particular analog stick of a video game pad is determined by the resistance set by the manufacturer. If an analog stick is not comfortable to use or is difficult to manipulate because the resistance is too high, the player's level of enjoyment playing a video game decreases. Additionally, the player may have to return the video game pad to the store where the video game pad was purchased and/or purchase a new video game pad that is more comfortable for the player to use, all of which is costly and time consuming for the player.

Accordingly, there is a need for an analog stick for a video game pad which is adjustable to enable players to choose the amount of resistance for the stick and enhance comfort and control of the video game pad for the players.

SUMMARY OF THE INVENTION

The present invention generally refers to a control apparatus for a video game pad and specifically, to an adjustable tension analog stick that enables a player to adjust the resistance of the tension analog stick to enhance the comfort and control of the stick while playing a game such as a video game.

In one embodiment, an adjustable control apparatus for a video game device is provided for enabling a user such as a player to adjust the tension of the control apparatus to enhance the comfort and control of the apparatus and the game pad. The control apparatus includes a first housing. A second housing movably connected to the first housing. A positioning member positioned in the second housing wherein the positioning member enables a player to move the control apparatus to a number of positions. A tension member such as a spring positioned adjacent to the positioning member, which provides tension or resistance to the positioning member. In addition, the control apparatus includes an adjustment member adapted to enable a user to adjust the tension of the tension member and thereby adjust the resistance of the positioning member of the control apparatus.

It is therefore an advantage of the present invention to provide an adjustable control apparatus for a video game pad that enables a player to customize the comfort and resistance of the control apparatus.

Additional features and advantages of the present invention are described in, and will be apparent from, the following Detailed Description of the Invention and the figures.

BRIEF DESCRIPTION OF THE DRAWINGS

FIG. 1B is a perspective view of one embodiment of the control apparatus of the present invention.

FIG. 2A is an elevation view of the embodiment of the control apparatus illustrated in FIG. 1.

FIG. 2B is a side elevation view of the embodiment of the control apparatus illustrated in FIG. 2A.

FIG. 2C is a section view of the embodiment of the control apparatus illustrated in FIG. 2A taken substantially along line A-A.

FIG. 2D is a top view of the embodiment of the control apparatus illustrated in FIG. 2A.

FIG. 2E is a bottom view of the embodiment of the control apparatus illustrated in FIG. 2A.

FIG. 6 is a side perspective view of one embodiment of the positioning member of the control apparatus.

FIG. 7A is an elevation view of the embodiment of the positioning member illustrated in FIG. 6.

FIG. 7B is a left side elevation view of the embodiment of the positioning member illustrated in FIG. 7A.

FIG. 7C is a right side elevation view of the embodiment of the positioning member illustrated in of FIG. 7A.

FIG. 8A is a top view of the embodiment of the positioning member illustrated in FIG. 7A.

FIG. 8B is a bottom view of the embodiment of the positioning member illustrated in FIG. 7A.

FIG. 11 is a side perspective view of one embodiment of the control disc of the control apparatus.

FIG. 12A is an elevation view of the clutch member illustrated in FIG. 11.

FIG. 12B is a left side elevation view of the clutch member illustrated in FIG. 12A.

FIG. 12C is a right side elevation view of the clutch member illustrated in FIG. 12A.

FIG. 12D is a top view of the clutch member illustrated in FIG. 12A.

FIG. 12E is a bottom view of the clutch member illustrated in FIG. 12A.

DETAILED DESCRIPTION OF THE INVENTION

The present invention generally refers to a control apparatus for a video game pad and specifically, to an adjustable tension analog stick for a game controller or video game pad 100 that enables a user such as a player to adjust the resistance of the tension analog stick to enhance the comfort and control of the stick.

Figure 1A:
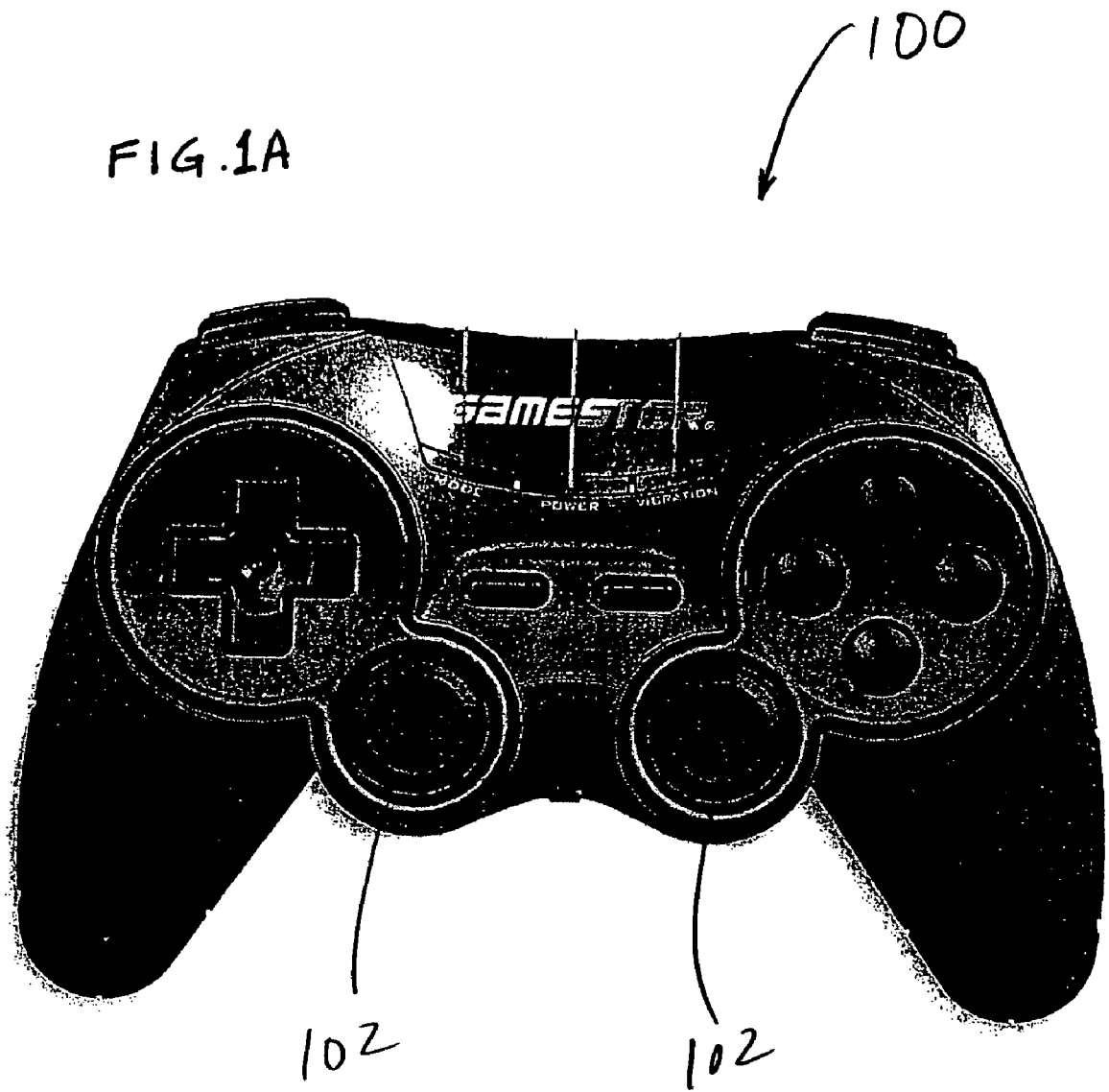
FIG. 1A is a perspective view of one embodiment of a video game pad including at least one control apparatus of the present invention.
Figure 3:
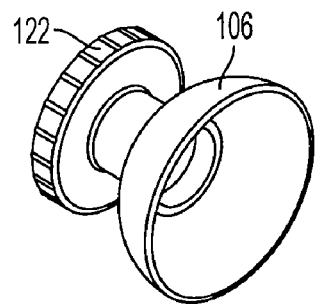
FIG. 3 is a perspective view of one embodiment of the second housing of the control apparatus.
Figure 4A:
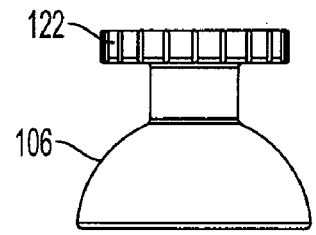
FIG. 4A is an elevation view of the embodiment of the second housing illustrated in FIG. 3.
Figure 4B:
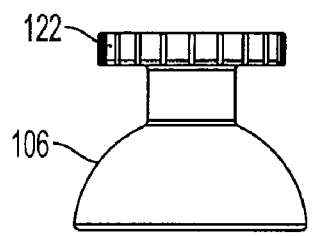
FIG. 4B is a left side elevation view of the embodiment of the second housing illustrated in FIG. 4A.
Figure 4C:
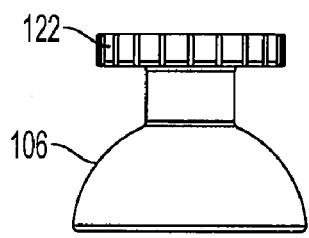
FIG. 4C is a right side elevation view of the embodiment of the second housing illustrated in FIG. 4A.
Figure 5A:
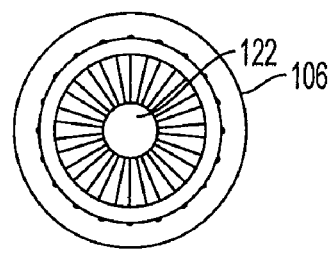
FIG. 5A is a top view of the embodiment of the second housing illustrated in FIG. 4A.
Figure 5B:
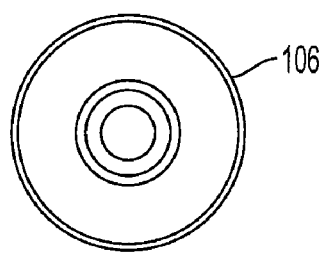
FIG. 5B is a bottom view of the embodiment of the second housing illustrated in FIG. 4A.
Figure 10C:
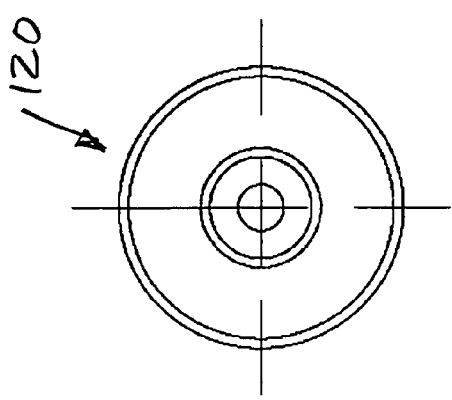
FIG. 10C is a bottom view of the embodiment of the flexible member in FIG. 10A.
Figure 10A:
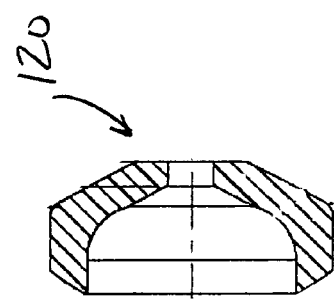
FIG. 10A is a section view of the flexible member illustrated in FIG. 9 taken substantially along line A-A.
Figure 10B:
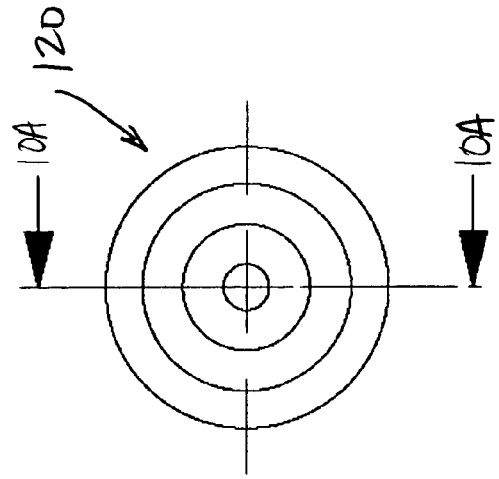
FIG. 10B is a top view of the embodiment of the flexible member illustrated in FIG. 10A.
Figure 9:
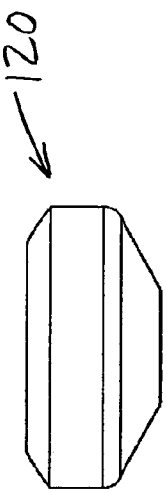
FIG. 9 is a perspective view of one embodiment of the flexible member of the control apparatus.
Figures 13A, 13B:
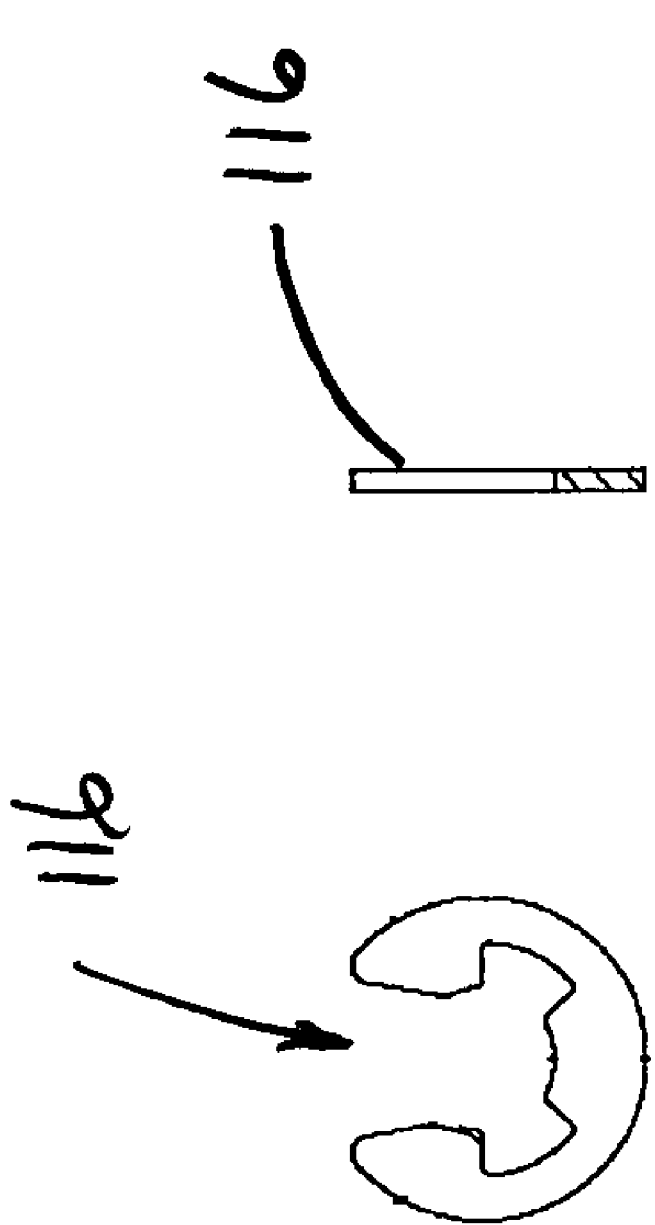
FIG. 13A an elevation view of one embodiment of the support member of the control apparatus.
FIG. 13B is a side view of the support member illustrated in FIG. 13A.
Figure 14C:
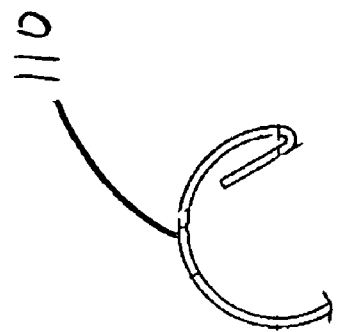
FIG. 14C is a partial bottom view of the tension member illustrated in FIG. 14A.
Figure 14A:
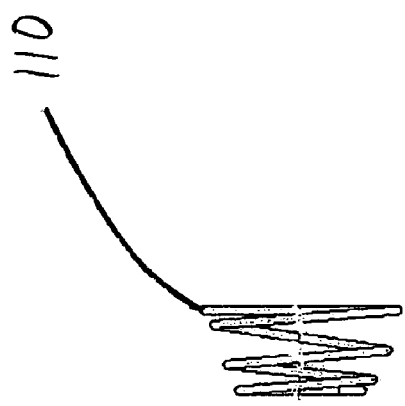
FIG. 14A is an elevation view of one embodiment of the tension member of the control apparatus.
Figure 14B:
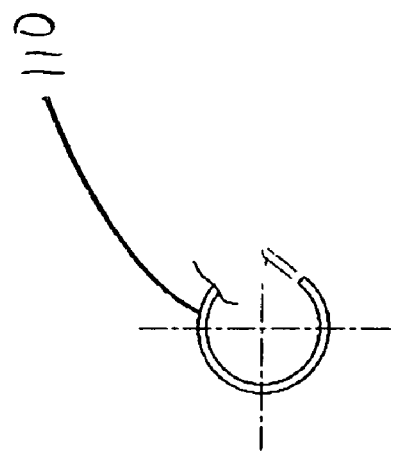
FIG. 14B is a partial top view of the tension member illustrated in FIG. 14A.

Referring now to the FIGS. 1A to 14C, in one embodiment, the control apparatus or adjustable tension analog stick 102 includes a first housing 104, a second housing 106 movably connected to the first housing, a positioning member 108 connected to or mounted to the second housing 106 to enable a player to change the positions of the control apparatus, a tension member such as spring 110 positioned adjacent to the positioning member to provide resistance or tension to the positioning member and an adjustment member 112 connected to the tension member to enable a player to adjust (i.e., increase or decrease) the tension of the tension member on the positioning member to modify the resistance of the positioning member.

In one embodiment, the lateral resistance of the control apparatus 102 is accomplished through the coupling of several parts, as shown in the figures, that enable a user or player to increase and/or decrease the tension or resistance of the analog stick without affecting the recovery of the stick. As described above, the uppermost part in the assembly is a positioning member or stick 108 which is nested inside a second housing or dome 106. A clutch member such as a clutch disc 114 and a tension member such as a spring 110 are assembled between the stick and dome. The stick 108 and dome 106 are connected or otherwise held together via a support member or a C-ring 116. The C-ring 116 fits into or assembles to a groove 118 on the shaft of the stick 108. A flexible member or a rubber ring 120 is positioned or trapped between the dome and the signal transfer member 124 which is connected to or assembled to a circuit board such as a PC board or PCB (not shown).

The perimeter of the upper portion of the second housing or dome 106 contains serrations 122 that allow the user to grip and twist it in order to change the resistance of the analog stick. When the stick 108 and thereby the second housing or dome 106 is rotated, it moves toward or away from the first housing 104 via threads inside the shaft that interface with the stick. As the dome moves downward relative to the first housing, the rubber ring 120 is compressed between the stick and the first housing, resulting in increased resistive force to activate the stick. As the stick and second housing or dome move upward relative to the first housing, the pressure on the rubber ring 120 is diminished, reducing the force. Thus, the tightness of the stick determines the amount of resistance so the user can choose the desired feel, comfort and control of the stick and adjust the tightness or tension accordingly.

In one embodiment, the clutch member or clutch disc 114 acts as a detent to hold the dome at a selected position while the game is being used.

In one embodiment, the tension member is a spring 110 that provides tension or resistance to the stick. In one embodiment, the tension member or spring is nested with or positioned adjacent to the stick 108 and inside the second housing or dome 106. In another embodiment, the tension member is connected to or otherwise attached to the stick. It should be appreciated that the tension member may be a spring, resilient foam or any other suitable tension device or resilient member.

In one embodiment, the C-ring 116 holds the stick and the dome together. It should be appreciated that the control apparatus may include one or more C-rings 116. It should also be appreciated that the C-rings may be positioned and/or connected to any suitable portion of the stick that enables the C-ring to connect or otherwise hold the stick and the dome together. It should be further appreciated that any suitable connector or fastening member may be used to connect the stick and the dome.

In one embodiment, the flexible member is a rubber ring 120. It should be appreciated that the flexible member may be a rubber ring, a flange or any other suitable flexible or resilient member. It should also be appreciated that one or more rubber rings may be employed by the control apparatus.

In one embodiment, the signal transfer member 124 is connected to a circuit board such as a P.C. board or PCB. The signal transfer member transfers the signals, such as electrical signals, generated by the movement of the stick to the circuit board to correspondingly control and/or manipulate the movement of an image, icon, character or the like associated with a game being operated by a video game device.

It should be appreciated that the components or parts of the control apparatus described above may be manufactured with metal, plastic or any other suitable material or combinations of materials.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A control apparatus comprising:
   a first housing;
   a second housing movably connected to said first housing at a connection location;
   a tension member positioned adjacent to said second housing, wherein said tension member provides an amount of tension to the second housing;
   an adjustment member adapted to enable a user to adjust the tension of said tension member, wherein an axis extends through the first housing, the second housing, the connection location and the adjustment member, the tension member exerting a force upon the second housing substantially parallel to the axis; and
   a signal transfer member coupled to the second housing, wherein the signal transfer member is in communication with a processor of an electronic game device.

2. The control apparatus of claim 1, wherein the tension member includes a spring.

3. The control apparatus of claim 1, wherein the adjustment member includes a clutch member.

4. The control apparatus of claim 3, wherein the clutch member includes a clutch disc.

5. The control apparatus of claim 1, wherein the second housing includes at least one serration.

6. The control apparatus of claim 1, which includes a support member attached to the second housing and a positioning member to hold the second housing and positioning member together.

7. The control apparatus of claim 6, wherein the support member includes at least one C-ring.

8. The control apparatus of claim 1, which includes a flexible member removably attached to the second housing.

9. The control apparatus of claim 8, wherein the flexible member includes a rubber ring.

10. A control assembly for a video game controller comprising:
   a housing;
   a control member movably coupled to the housing at a coupling location;
   a tension member connected to the control member, said tension member enabling a user to adjust the tension of the control member; and
   a signal transfer member connected to the control member, wherein the signal transfer member is in communication with a processor of a video game system, and wherein the tension member is adjustable by the user to modify the tension of the control member, wherein the control member is movable by the user to one or more positions to cause said signal transfer member to generate and send a signal to the processor of the video game system to manipulate the movement of an image associated with the video game system, wherein the tension member is adjustable without substantially altering the one or more positions, and wherein an axis extends through the coupling location, the tension member and the signal transfer member.

11. The control assembly of claim 10, wherein the tension member includes a spring.

12. The control assembly of claim 10, wherein said tension member includes an adjustment member to enable the user to move the adjustment member to adjust the tension of said tension member.

13. The control assembly of claim 12, wherein the adjustment member includes a clutch member.

14. A method of operating a game controller comprising:
   (a) providing at least one control apparatus including a positioning member, an adjustment member and a tension member connected to the positioning member, wherein the positioning member is movably coupled to a housing, wherein an axis extends through the positioning member, the adjustment member, the tension member and the housing, wherein the at least one control apparatus is operable to provide input to an electronic device executing an electronic game;
   (b) adjusting the tension of the control apparatus by performing at least one of the following:
     (i) increasing the tension of the control apparatus by moving the adjustment member in a first direction to increase the tension of the tension member;
     (ii) decreasing the tension of the control apparatus by moving the adjustment member in a second different direction to decrease the tension of the tension member, wherein adjusting the tension does not alter the range of motion of the positioning member relative to the housing; and
   (c) repeating (b) until the tension of the control apparatus equals a desired tension of a user.

15. The method of claim 14, wherein the tension member includes a spring.

16. The control apparatus of claim 1, wherein the second housing extends at least partly though an opening of the first housing, and wherein the axis extends though the opening.

17. The control apparatus of claim 16, wherein the adjustment member controls the amount the second housing extends though the opening.

18. A control apparatus comprising:
   a first housing having an opening;
   a second housing movably connected to said first housing and extending at least partly through the opening;
   a tension member positioned adjacent to the second housing, wherein the tension member provides an amount of tension to the second housing;
   an adjustment member adapted to enable a user to adjust the tension of the tension member, wherein the adjustment member controls the amount the second housing extends through the opening; and
   a signal transfer member coupled to the second housing, wherein the signal transfer member is in communication with a processor of an electronic device operable to execute an electronic game.

19. The control apparatus of claim 1, wherein the connection location includes an opening in the housing and wherein the control member extends through the opening.

20. The control apparatus of claim 1, wherein the adjustment member is rotatable about the axis.

* * * * *